3,179,610
JOINT SEALER AND PAVING COMPOSITIONS CONTAINING LIQUID POLYURETHANE AND BITUMINOUS MATERIAL

Paul R. Wood, Naugatuck, Conn., assignor to United States Rubber Company, New York, N.Y., a corporation of New Jersey
No Drawing. Filed Aug. 29, 1960, Ser. No. 52,336
5 Claims. (Cl. 260—28)

This is a continuation-in-part of my application Serial No. 664,487, filed June 10, 1957, now abandoned.

This invention relates to novel compositions obtained from blending a polyurethane-type prepolymer with a bituminous composition (asphalt or tar).

Such a composition may be used in a variety of useful ways, for many construction applications such as joint fillers and sealers, caulking compounds, aggregrate-binder mixes for pavements, shock absorbent coating over hard surfaced playgrounds, gasoline-resistant surface coatings for gas stations, adhesives for laminating paper, wood, metal, plastic, etc.

A unique property or properties of such a blend is that the unlike materials are compatible with one another over a wide range, to form a cold or hot pouring composition which can be cured with the aid of known polyurethane curing agents to a non-thermoplastic state that not only resists high temperatures but shows good jet fuel (and gasoline) resistance. The blends also have good bonding properties when applied to cold or wet concrete surfaces.

Another discovery is that the cold-poured joint sealing compositions of the present invention, in contrast to experience with most cold-poured materials in this art, pass substantially all the tests required for a hot-poured joint sealing material, which makes for ease of application.

Polyurethane prepolymers are, as is well-known reaction products of polyisocyanates, generally diisocyanates, used in molar excess with compounds containing a plurality of groups reactive with isocyanate groups, such as hydroxy or carboxy groups, and have generally a molecular weight in the range of from 500 to 5000. Such polyurethane prepolymers where the diisocyanate is partially reacted may be handled safely and may readily be mixed with the asphalt or tar without the dangerous irritation to the mucous membranes, particularly of the respiratory system and eyes, that would accompany the use of the unreacted diisocyanate if the diisocyanate and the compound containing a plurality of hydroxy or carboxy groups were separately added to the asphalt or tar. The terms "asphalt" and "tar" are used herein in their commonly accepted meaning as set forth on pages 56 and 57 of "Asphalts and Allied Substances," by Herbert Abraham, 4th Edition, D. Van Nostrand Co., Inc., 1938.

The polyurethane prepolymers are liquid at ordinary room temperatures (20–25° C.) and readily mix at such temperatures or at elevated temperatures with the bituminous material at the site of use without special equipment. This is in contrast with the blending of natural rubber, or similar sulfur-vulcanizable synthetic rubbers with bitumens, which require special equipment for their mixing, and which are hard to handle even at low rubber content levels.

Polyurethane prepolymers generally may be used, and these are prepared by reacting a polyisocyanate in molar excess with a compound containing a plurality of hydroxy or carboxy groups which are reactive with isocyanate groups. By molar excess of diisocyanate is meant an excess of the diisocyanate over that necessary to react with all the hydroxy or carboxy groups of the other reactant. By using a molar excess of the polyisocyanate, unreacted isocyanate groups are present in the reaction product for further reaction or curing in situ after mixing with the asphalt or tar and shaping, as by pouring in the space between opposed faces of adjacent sections of concrete paving construction to form a joint sealer or by applying to a road surface in conjunction with mineral aggregate to form a paving surface. The amount of molar excess diisocyanate in preparing the polyurethane prepolymer is not critical, generally the molar excess will be in amount so that 10% to 80% of the isocyanate groups of the original polyisocyanate are unreacted after reaction with all the hydroxy or carboxy groups of the other reactant. The polyisocyanates that may be used in the present invention are well known, examples being 2,4-toluene diisocyanate, mixtures of 2,4-toluene diisocyanate and 2,6-toluene diisocyanate, diphenylmethane 4,4'-diisocyanate, hexamethylene diisocyanate, 3,3'-dimethyl diphenylmethane-4,4'-diisocyanate, metaphenylene diisocyanate, triphenylmethane triisocyanate, octamethylene diisocyanate, decamethylene diisocyanate. Various classes of compounds having a plurality of hydroxy or carboxy groups may be reacted with the polyisocyanates in preparing the polyurethane prepolymers as is well known. One class of compounds that may be reacted with the polyisocyanates is the hydroxy-containing unsaturated higher fatty acid triglycerides, usually castor oil, the main constituent of which is the triglyceride of ricinoleic acid. A second class of compounds that may be reacted with the polyisocyanates comprise polyesters made by reacting dicarboxylic acids with dihydric alcohols. Examples of dicarboxylic acids for preparation of the polyesters are adipic acid, azelaic acid, sebacic acid, and dimers of unsaturated higher fatty acids, e.g. dilinoleic acid. Examples of dihydric alcohols for preparation of the polyesters are ethylene glycol, diethylene glycol, triethylene glycol, propylene glycol, dipropylene glycol, tetramethylene glycol (1,4-butane diol), 1,2-butane diol, 1,3-butane diol, 2,3-butane diol, 2,2-dimethyl-1,3-propane diol, 2,2'-diethyl-1,3-propane diol, 2-ethyl-2-butyl-1,3-propane diol, 2,3-dimethyl-2,3-butane diol, 2-methyl-2,4-pentane diol, hexamethylene glycol, (1,6-hexane diol), 2,5-hexane diol, 2-ethyl-1,3-hexane diol, 2,2-dimethyl-1,6-hexane diol, 1,8-octane diol, 1,10-decane diol. A third class of compounds that may be reacted with the polyisocyanates comprise polyalkylene ether polyalcohols, also called polyoxyalkylene polyalcohols or polyoxyalkylene ether polyalcohols. Examples of such polyalkylene ether polyalcohols are polyethylene glycols, polypropylene glycols, and reaction products of alkylene oxides, such as ethylene oxide or propylene oxide or mixtures of ethylene oxide and propylene oxide, with polyhydric alcohols, such as dihydric alcohols (glycols) or trihydric alcohols. Examples of such reaction products of alkylene oxides and polyhydric alcohols are reaction products of ethylene oxide or propylene oxide or mixtures of ethylene oxide and propylene oxide with ethylene glycol, propylene glycol, tetramethylene glycol (1,4-butane diol), 1,2-butane diol, 1,3-butane diol, 2,3-butane diol, 2,2-dimethyl-1,3-propane diol, 2,2-diethyl-1,3-propane diol, 2-ethyl-2-butyl - 1,3-propane diol, 2,3-dimethyl-2,3-butane diol, 2-methyl-2,4-pentane diol, hexamethylene glycol (1,6-hexane diol), 2,5-hexane diol, 2-ethyl-1,3-hexane diol, 2,2-dimethyl-1,6-hexane diol, 1,8-octane diol, 1,10-decane diol, glyceral trimethylol propane, 1,2,6-hexanetriol.

Polyurethane prepolymers generally as above described may be used, although special emphasis is placed herein on the following.

(I) The castor oil derived polyurethanes, specially where castor oil is reacted with (1) toluene diisocyanate or (2) diphenylmethane 4,4'-diisocyanate.

(II) Polyester derived polyurethanes, specially the adipic acid-glycol polyesters which are reacted with either (3) toluene diisocyanate, or (4) diphenylmethane 4,4'-diisocyanate; and the dilinoleic acid-glycol polyesters reacted with either (5) toluene diisocyanate or (6) diphenylmethane 4,4'-diisocyanate.

(III) Polyether derived polyurethanes, specially those from polypropylene glycol reacted with either (7) toluene diisocyanate or (8) diphenylmethane 4,4'-diisocyanate; and those from polyoxypropylene 1,2,6-hexane triol reacted with either (9) toluene diisocyanate or (10) diphenylmethane 4,4'-diisocyanate.

Representative of these types, the following details are given with respect to the preparation of the prepolymers (1), (4) and (9):

(1) One mole of castor oil is reacted for about one hour at about 85° C. with three moles of 80:20 TDI (80 parts by weight of 2,4-toluene diisocyanate and 20 parts by weight of 2,6-toluene diisocyanate).

(4) In preparing the polyester, to one mole of adipic acid there is added 0.7 mole of ethylene glycol and 0.3 mole of propylene glycol. The mix is heated under nitrogen to remove water until a hydroxyl number of 60 is obtained. In preparing the polyurethane prepolymer, to one mole of the polyester is added two moles of diphenylmethane 4,4'-diisocyanate, and the mix heated at about 85° C. to about 100° C.

(9) The polyoxypropylene 1,2,6-hexanetriol used is made by reacting propylene oxide with 1,2,6-hexanetriol to give a hydroxyl number of about 42. One mole of the polyoxypropylene 1,2,6-hexanetriol is mixed with 3 moles of 80:20 TDI (80 parts by weight of 2,4-toluene diisocyanate and 20 parts by weight of 2,6-toluene diisocyanate) and heated for 1½ hours at about 90° C., after which 16% by weight of additional 80:20 TDI based on the weight of the total original charge is added and heated for an additional hour at about 90° C.

Hereafter, in the examples, the polyurethane prepolymers will be referred to by the above numbers in parentheses "( )."

The asphalt and tar bitumen may be used alone or mixed, and may be replaced in part with various proportions of synthetic polymeric plasticizers. Examples of such synthetic plasticizers are the polymers derived from crude mixtures of styrene and styrene homologs such as those obtained from the fractionation of the so-called "Crude Solvents" from "Light Oils" scrubbed out of coke-oven or gas-house gas, coumarone indene or paracoumarone indene resin polymers, liquid rubbers of various types, such as natural rubber, polybutadiene, SBR rubbers (copolymers of butadiene and styrene), and copolymers of butadiene and acrylonitrile or methacrylic acid, etc., chlorinated biphenyl and chlorinated polyphenyl plasticizers, polymers derived from polycyclic unsaturated monomers obtained during the cracking process of asphalts, etc. The liquid synthetic rubbers referred to are low molecular weight polymers having a viscosity average molecular weight in the 1000-10,000 range. Tar cutback oils may also be used as well as oils commonly used for oil master-batching of SBR rubber.

In conventional road building practice, hot bituminous binder (asphalt or road tar) is mixed with mineral aggregate at a pug mill and the mix is then transported to the paving site, or the dry aggregate is first laid on the road and the hot binder is then sprayed on the aggregate. In these operations the binder is at a temperature of 250° F. to 400° F. (generally 250° F. to 350° F.). The asphalt binders used are graded according to penetration values at 77° F. as measured by the Standard Method of Test for Penetration of Bituminous Materials (A.S.T.M. D5–52), the penetration values being measured as the tenths of a millimeter that a tapered standard needle (0.14 to 0.16 mm. tip diameter) will penetrate the asphalt in five seconds with a 100 gram load. The overall penetration range for the various asphalt binders used is from 40 to 300. The ranges 40–70 are generally for asphalt for hot climates, 70–110 generally for temperate climates, and 110–300 generally for cold climates. The road tar binders used are graded according to the Standard Method of Float Test for Bituminous Materials (A.S.T.M. D139–49), wherein a cup having a plug made of the tar under test is floated in a bath of water at 50° C. The water melts the plug, filling the cup and the time in seconds is recorded for the cup to sink. The road tars used as binders herein are designated from RT–6 to RT–12, and have an overall float test range from 20 seconds to 220 seconds. The float test ranges of the various road tars used are about 20–27 seconds for RT–6, 27–42 seconds for RT–7, 42–54 seconds for RT–8, 54–75 seconds for RT–9, 75–100 seconds for RT–10, 100–150 seconds for RT–11, and 150–220 seconds for RT–12. Asphalts above 300 penetration are fluid enough at ordinary room temperatures to be stirred with the polyurethane prepolymer. Tars such as RT–6, RT–7, and RT–8 are also fluid enough to be stirred. Commercial asphalts and tars which are commonly used as rubber softeners may also be used in admixture with polyurethane prepolymers in the present invention. For example, BRT. which is used as a rubber softener and which is a refined tar having a specific gravity of 1.15 to 1.20, and BRV. which is also a rubber softener and which is a dark coal tar used as a rubber compounding and reclaiming oil and which has a specific gravity of 1.14 to 1.18 and not more than 28% of which distills at 355° C., may be mixed with the polyurethane prepolymer, shaped, and the prepolymer cured in situ. Cold-applied material can also be applied in a caulking gun where the material is more viscous.

While asphalt is useful in the practice of this invention, tar is the preferred bitumen since it is more compatible with polyurethane. Also, the soft tars are preferred over the harder tars, because here again the soft tars are more compatible with polyurethane.

The compositions of the present invention comprise a major proportion by weight of the bitumen and a minor proportion by weight of the polyurethane prepolymer. Generally, the weight ratio of polyurethane prepolymer to bituminous material will be from 1:19 to 1:3, that is, the polyurethane prepolymer will be from 5% to 25%, based on the sum of the weights of the bituminous material and polyurethane prepolymer. Generally, for use in conjunction with aggregate for paving surfaces, the weight ratio of polyurethane prepolymer to bitumen will be from 1:19 to 1:3, i.e. the polyurethane prepolymer will be from 5% to 25%, based on the sum of the weights of the bituminous material and polyurethane prepolymer. Such aggregate may be any of the types of mineral aggregate used in road paving constructions including sand, crushed stone, slag, dolomite and with which it is customary to use an asphalt or tar binder. Generally, for use as a joint sealer, the weight ratio of polyurethane prepolymer to bitumen will be from 1:9 to 1:3, i.e. the polyurethane prepolymer will be from 10% to 25%, based on the sum of the weights of the bituminous material and polyurethane prepolymer.

Since both the prepolymer and bituminous material are liquid, when applied, they can be blended by simple stirring at room or elevated temperatures. When the bituminous material is liquid at room temperature, the blend can be made by simple stirring. If the bituminous material is too viscous at room temperature, or if a hot application is desired, the blend may be made at higher temperatures. Asphalts can usually be heated hotter than tars. Tars are usually not heated above about 250° F.

The blends may be cured at room temperature by addition of a polyurethane curing agent, among the known ones being water, and compounds having two or more groups containing active hydrogen atoms such as hydroxyl, primary amino, secondary amino and mercapto groups, e.g., ethylene glycol, glycerol, sorbitol, diethylene glycol, ethylene diamine, p,p'-diaminodiphenylmethane, mercaptoethanol, dichlorobenzidine, etc. The cured blends exhibit higher tensile and toughness, with non-thermoplastic properties, as compared to the conventional rubber-bitumen blends.

A useful feature, particularly in connection with the joint fillers and sealers, is the fact that the blends may be foamed and cured in situ (in place). For this purpose, water may be additionally added in amounts to react with the prepolymer and cause foaming to a cellular condition to take place before or during cure.

Foaming takes place because of the liberation of $CO_2$ from the reaction of the water with the isocyanate end groups in the prepolymer. Usually a stoichiometric amount of water is added, although more or less water can be used.

If water is used as the curing agent in a polyurethane prepolymer-plasticizer blend, foaming occurs when the liberated $CO_2$ cannot escape from the medium. When foaming is desired, the viscosity of the blend should be high enough to prevent the loss of $CO_2$. Viscosity of the blend can be controlled by temperature or by controlling the viscosity of the individual components.

In some cases, water can be used as the curing agent for the blend without foaming. A particular example is when the blend is used in pavement applications as the binder for the aggregate. In such cases, the water for curing may come from the air after the aggregate and binder are in place. Film thickness of binder on aggregate is in the 10 micron range. In such thin films, the liberated $CO_2$ escapes without producing a foam.

When foaming is desired, the cell structure can be controlled to some extent by the foam density which in turn can be controlled by the amount of water used and the amount of $CO_2$ held in the blend, e.g., stirring during the initial foaming process collapses the initial foam releasing some $CO_2$.

Low density (0.25 g./cc. level) foams have an open cell structure. When used for joint sealing or caulking applications, however, the surface can be sealed by collapsing the outer surface of the foam with a hot iron. A non-foamed blend can also be placed on top or around the foamed product. Conventional joint sealing compounds may also be used for this purpose. Higher density foams (0.4 to 0.8 g./cc.) have some closed cells.

In some cases, tar, as commercially obtained, has enough water in it to foam and cure a blend of this tar with the polyurethane prepolymer. If desirable, the water can be removed by distillation or by the addition of a water absorbing agent, such as CaO and the like, or an agent which chemically combines with the water, such as a metal hydride.

When foaming is desired, it begins to take place as soon as the water is added and becomes cured or set enough to hold the foamed shape in 5 to 30 minutes. Additional curing then takes place.

In some of the hot mix applications it may be desirable to first blend plasticizers as above described with the tar. It is well known that a high percentage of the low molecular weight components of tars is lost during the hot-mix cycle due to volatility. These low molecular weight volatile materials in tar can be replaced with some of the synthetic plasticizers discussed previously which do not volatilize as readily. Rubberized bituminous blends may also be used with the polyurethane prepolymer. In such instances, it is preferred to first blend the rubber with the bituminous material, e.g., 1 to 10 parts of a rubber per 100 parts of bitumen, before mixing with the polyurethane prepolymer. The type of rubber may be a nitrile-type rubber, SBR rubber, butyl rubber or natural rubber. By "nitrile-type rubber" is meant any of the known rubbery copolymers embodying a conjugated diene and at least 20% of combined acrylonitrile, or equivalent methacrylonitrile. Representative nitrile-type rubbers are NBR rubbers such as Perbunan and Paracril, which are copolymers of a major proportion (51 to 80 parts by weight) of butadiene-1,3 and a minor proportion (correspondingly 49–20 parts by weight) of acrylonitrile; or reclaims thereof may be used.

Examples of bitumen and polyurethane prepolymer blends for the various uses are illustrated in the following examples. All parts, percentages and ratios referred to herein are by weight.

JOINT SEALER—APPLICATION (EXAMPLES 1 TO 3)

Example 1.—Jet fuel resistance test

Blends of polyurethane prepolymer numbers 5, 6, or 1 with RT–6 or RT–12 tars were made. Ratios, by weight, of prepolymer to tar was about 1 to 3. Some blends were foamed by water that had been added to the tar to densities varying between 0.25 g./cc. and 1.1 g./cc. for unfoamed samples. After one week storage and completion of the cure, samples of each were immersed in jet fuel. Inspection of samples after immersion showed no change in properties.

Example 2.—Freeze and bond test for joints

In this test, a joint is poured between the opposite faces of two concrete blocks spaced one inch apart, using the material under test. After curing and storage, the test pieces are cooled by placing in a box at 0° F. or −20° F. The cold test pieces are then put through five cycles of being pulled slowly apart to an extension of 50% of the width of the joint and then relaxed. After this test, there must be no splitting of the joint sealer or separation of the joint sealer from the faces of the concrete blocks.

Blends of polyurethane prepolymer numbers 5, 6, or 1 with RT–6 or RT–12 tars were tested. Ratios, by weight, of the prepolymer to tar ranged from about 1:4 to 1:3. The freeze and bond test specimens were prepared using RT–6 blends as cold poured material and RT–12 blends as hot poured material. After storage for one week and completion of the cure from water contained in the tar, the samples were tested. Some of the blends were poured between wet concrete blocks. All blends passed the required test for bonding at 0° F.

Blends of prepolymer number 9 with BRV tar which was previously blended with 6 parts of butadiene-acrylonitrile copolymer rubber per 100 parts of the BRV tar, were tested. The ratios, by weight, of prepolymer to BRV tar were about 1:6 and 1:5 and 1:4. Test specimens for the freeze and bond test were cold poured, and the prepolymer foamed and cured with water. The test specimens passed the freeze and bond test at −20° F.

Example 3.—Flow test

In the flow test, a frame is placed on a steel panel and the material to be tested is poured in the frame to a thickness of 0.32 centimeter. After the material to be tested has set, the frame is removed leaving the 0.32 centimeter thickness of material on the surface of the steel panel. In testing the material, the steel panel is tipped to a 75° angle and the panel is heated for 5 hours at 140° F. The material should not flow more than one-half centimeter.

Blends of polyurethane prepolymers number 1 to 8 in representative commercial samples of various bitumens mentioned above, with ratios, by weight, of prepolymer to bitumen from about 1:4 to 1:3, both foamed and unfoamed, showed no flow under the flow test.

All blends were non-thermoplastic when cured and would not flow when flamed with a Bunsen burner.

*Example 4.—Caulking compound*

A typical caulking compound which can readily be packed into and applied from standard caulking guns is as follows:

| | Parts |
|---|---|
| RT-6 coke-oven tar | 225 |
| Polyurethane prepolymer No. 1 | 75 |
| Triethanolamine | 2.5 |
| 3,3'-dichlorobenzidine | 4.5 |

Moisture is first removed from the tar by distillation, or it can be done by addition of such agents as calcium oxide, metal hydrides, etc. Such a caulking compound has a pot life of about 1½ hours. It cures to a non-thermoplastic rubber-like mass at room temperature without foaming.

PAVEMENT APPLICATION (EXAMPLES 5 AND 6)

*Example 5.—Impact test and compression flow test*

Aggregate-binder mixes were compacted into rectangular blocks simulating sections of pavements. Two types of aggregate were used; crushed gravel and traprock. Six percent, by weight, of binder was used based on total weight. The binder was RT-6 coke-oven tar, with and without polyurethane prepolymer number 5. The test blocks were 1½ inches thick, 2 inches wide, and 6 inches long. After one week storage and completion of the cure from water in the tar, impact test and compression-flow tests were made on the test blocks.

In the impact test, the number of ball [1] drops to cause fracture at different temperatures was recorded. Results were as follows:

IMPACT TEST

| Binder Used | No. of Ball Drops to Cause Fracture | | |
|---|---|---|---|
| | 0° C. | 10° C. | 15° C. |
| 3 pts. RT-6 tar + 1 pt. polyurethane prepolymer No. 5. | No sign of fracture at 50 drops | | |
| RT-6 tar | 1 | 1 | 1 |

In the compression-flow test, the test block stands on end and a 2000 gram weight is placed on top. The amount of downward movement of the 2000 gram weight at 140° F. versus time was recorded. Results were as follows:

| Binder Used | Flow at 140° F. |
|---|---|
| 3 pts. RT-6 tar + 1 pt. polyurethane prepolymer No. 5. | No flow in 48 hours. |
| RT-6 tar | Block collapsed at once. |

*Example 6.—Marshall stability test*

Hot-mix type aggregate-binder mixes were made with six percent, by weight, of various binders based on the total weight. The mixes were compacted into Marshall stability test specimens and stored one week before testing. In the test the compression strength of molded aggregate-binder test specimens is measured. Results were as follows:

| Binder used: | Compression strength (lbs.) |
|---|---|
| RT-12 tar | 645 |
| 9 pts. RT-12 tar + 1 pt. polyurethane prepolymer No. 5 | 730 |
| 4 pts. RT-12 tar + 1 pt. polyurethane prepolymer No. 5 | 1140 |

The more fluid polyurethane-tar blends may be mixed with aggregate at room temperature. Such mixes show the same high Marshall stability and other desirable properties.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method which comprises mixing a liquid polyurethane prepolymer with a liquid bituminous material selected from the group consisting of asphalts and tars, shaping the mixture, and curing the polyurethane prepolymer in situ by reaction with material selected from the group consisting of water and compounds having at least two groups selected from the class consisting of hydroxyl, primary amino, secondary amino, and mercapto groups, said polyurethane prepolymer being the reaction product of a polyisocyanate in molar excess with a material selected from the group consisting of castor oil, dicarboxylic acid-glycol polyesters and polyalkylene ether polyalcohols, the weight ratio of said polyurethane prepolymer to said bituminous material being in the range from 1:19 to 1:3.

2. The method which comprises mixing a liquid polyurethane prepolymer with liquid bituminous material selected from the group consisting of asphalts and tars, shaping the mixture, and curing the polyurethane prepolymer in situ by reaction with water, said polyurethane prepolymer being the reaction product of a polyisocyanate in molar excess with castor oil, the weight ratio of said polyurethane prepolymer to said bituminous material being in the range from 1:19 to 1:3.

3. The method which comprises mixing a liquid polyurethane prepolymer with liquid bituminous material selected from the group consisting of asphalts and tars, shaping the mixture, and curing the polyurethane prepolymer in situ by reaction with water, said polyurethane prepolymer being the reaction product of a polyisocyanate in molar excess with a dicarboxylic acid-glycol ester, the weight ratio of said polyurethane prepolymer to said bituminous material being in the range from 1:19 to 1:3.

4. The method which comprises mixing a liquid polyurethane prepolymer with liquid bituminous material selected from the group consisting of asphalts and tars, shaping the mixture, and curing the polyurethane prepolymer in situ by reaction with water, said polyurethane prepolymer being the reaction product of a polyisocyanate in molar excess with a polyalkylene ether polyalcohol, the weight ratio of said polyurethane prepolymer to said bituminous material being in the range from 1:19 to 1:3.

5. The method of making a paving surface which comprises mixing mineral aggregate with a binder composition comprising a mixture of a liquid polyurethane prepolymer and a liquid bituminous material selected from the group consisting of asphalt and tars, shaping the mineral aggregate and binder mixture, and curing the polyurethane prepolymer in situ by reaction with water, said polyurethane prepolymer being the reaction product of a polyisocyanate in molar excess with a material selected

---

[1] 225 gram ball; 1½ inch diameter, falling 3 feet.

from the group consisting of castor oil, dicarboxylic acid-glycol polyesters and polyalkylene ether polyalcohols, the weight ratio of said polyurethane prepolymer to said bituminous material being in the range from 1:19 to 1:3.

References Cited by the Examiner
UNITED STATES PATENTS

| | | | |
|---|---|---|---|
| 2,625,531 | 1/53 | Seeger | 260—77.5 |
| 2,686,166 | 8/54 | Taylor | 260—28.5 |
| 2,787,601 | 4/57 | Detrick et al. | 260—2.5 |
| 2,964,424 | 12/60 | Mast | 260—2.5 |

FOREIGN PATENTS

| | | |
|---|---|---|
| 559,282 | 6/58 | Canada. |
| 855,911 | 11/52 | Germany. |

OTHER REFERENCES

Depke, German application 1,044,323, printed Nov. 20, 1958 (Kl. 22i 1), 3 pages spec., no drwgs.

Mast, German application 1,000,946, printed Jan. 17, 1957, (Kl. 22i 1), 2 pages spec., no drwgs.

MORRIS LIEBMAN, *Primary Examiner.*

ALPHONSO D. SULLIVAN, *Examiner.*